Oct. 27, 1970 SHUNSUKE SAKODA ET AL 3,537,073

NUMBER DISPLAY SYSTEM ELIMINATING FUTILE ZEROS

Filed Dec. 13, 1966 3 Sheets-Sheet 1

INVENTORS.
BY SHUNSUKE SAKODA
MITSUHIRO HATTORI
Lewis H. Eslinger
ATTORNEY

INVENTORS.
SHUNSUKE SAKODA
MITSUHIRO HATTORI
BY
Lewis H. Eslinger
ATTORNEY

FIG. 3D.

| | TIME | CONTENTS OF REGISTER | COUNTER | $Q_1$ | $Q_2$ 01 | Tp 01 |
|---|---|---|---|---|---|---|
| $T_1$ | $t_1$ | 00.10203 | 0 | 0 | | |
| | $t_2$ | 300.1020 | 0 | 1 | | |
| | $t_3$ | 0300.102 | 0 | 0 | | |
| | $t_4$ | 20300.10 | 0 | 1 | | |
| | $t_5$ | 020300.1 | 0 | 0 | | |
| | $t_6$ | 1020300. | 0 | 1 | | |
| | $t_7$ | 0.102030 | 6 | 1 | | |
| $T_2$ | $t_1$ | 00.10203 | 5 | 0 | | |
| | $t_2$ | 300.1020 | 4 | 1 | | |
| | $t_3$ | 0300.102 | 3 | 0 | | |
| | $t_4$ | 20300.10 | 2 | 1 | | |
| | $t_5$ | 020300.1 | 1 | 0 | | |
| | $t_6$ | 1020300. | 0 | 1 | | |
| | $t_7$ | R.102030 | 0 | 1 | | |
| | $t_1$ | RR.10203 | 0 | 0 | | |
| | $t_2$ | 3RR.1020 | 0 | 1 | | |
| | $t_3$ | 03RR.102 | 0 | 0 | | |

FIG. 3E.

| | TIME | CONTENTS OF REGISTER | COUNTER | $Q_1$ | $Q_2$ 01 | Tp 01 |
|---|---|---|---|---|---|---|
| $T_1$ | $t_1$ | 00102.03 | 0 | 0 | | |
| | $t_2$ | 300102.0 | 0 | 1 | | |
| | $t_3$ | 0300102. | 0 | 0 | | |
| | $t_4$ | 2.030010 | 0 | 1 | | |
| | $t_5$ | 02.03001 | 6 | 0 | | |
| | $t_6$ | 102.0300 | 6 | 1 | | |
| | $t_7$ | 0102.030 | 5 | 1 | | |
| $T_2$ | $t_1$ | 00102.03 | 4 | 0 | | |
| | $t_2$ | 300102.0 | 3 | 1 | | |
| | $t_3$ | 0300102. | 2 | 0 | | |
| | $t_4$ | 2.030010 | 1 | 1 | | |
| | $t_5$ | 02.03001 | 1 | 0 | | |
| | $t_6$ | 102.0300 | 0 | 1 | | |
| | $t_7$ | R102.030 | 0 | 1 | | |
| | $t_1$ | RR102.03 | 0 | 0 | | |
| | $t_2$ | 3RR102.0 | 0 | 1 | | |
| | $t_3$ | 03RR102. | 0 | 0 | | |

FIG. 3F.

| | TIME | CONTENTS OF REGISTER | COUNTER | $Q_1$ | $Q_2$ 01 | Tp 01 |
|---|---|---|---|---|---|---|
| $T_1$ | $t_1$ | 00.10203 | 0 | 0 | | |
| | $t_2$ | 300.1020 | 0 | 1 | | |
| | $t_3$ | 0300.102 | 0 | 0 | | |
| | $t_4$ | 20300.10 | 0 | 1 | | |
| | $t_5$ | 020300.1 | 0 | 0 | | |
| | $t_6$ | 1020300. | 0 | 1 | | |
| | $t_7$ | 0.102030 | 0 | 1 | | |
| $T_2$ | $t_1$ | 00.10203 | 6 | 0 | | |
| | $t_2$ | 300.1020 | 5 | 1 | | |
| | $t_3$ | 0300.102 | 4 | 0 | | |
| | $t_4$ | 20300.10 | 3 | 1 | | |
| | $t_5$ | 020300.1 | 2 | 0 | | |
| | $t_6$ | 1020300. | 1 | 1 | | |
| | $t_7$ | 0.102030 | 0 | 1 | | |
| | $t_1$ | R0.10203 | 0 | 0 | | |
| | $t_2$ | 3R0.1020 | 0 | 1 | | |
| | $t_3$ | 03R0.102 | 0 | 0 | | |

INVENTORS.
SHUNSUKE SAKODA
MITSUHIRO HATTORI
BY Lewis H. Eslinger
ATTORNEY 3,537,073

NUMBER DISPLAY SYSTEM ELIMINATING FUTILE ZEROS

Shunsuke Sakoda and Mitsuhiro Hattori, Tokyo, Japan, assignors to Sony Corporation, Tokyo, Japan, a corporation of Japan Continuation-in-part of application Ser. No. 595,875, Nov. 21, 1966. This application Dec. 13, 1966, Ser. No. 601,493
Claims priority, application Japan, Dec. 16, 1965, 40/77,668
Int. Cl. G06f *3/14*
U.S. Cl. 340—172.5 3 Claims

ABSTRACT OF THE DISCLOSURE

This invention relates generally to a number display system, and more particularly to a serial number display system to display the output of units such as computers and in which futile or insignificant numbers are detected from the information stored in a register and the codes of the futile numbers are replaced by redundancy codes in order to eliminate the display of any futile or insignificant numbers.

CROSS REFERENCES TO RELATED APPLICATION

This application is a continuation-in-part of copending patent application Ser. No. 595,875, filed Nov. 21, 1966, and which has issued as U.S. Pat. No. 3,449,726, dated June 10, 1969, and entitled "Number Display System."

BACKGROUND OF THE INVENTION

This invention is particularly applicable to computers of the type in which the result of a calculation or the output of the computer is displayed as a series of numbers or digits by the use of indicator tubes which are sold commercially under the designation "Nixie Tube." In prior are computers of this type, the incicator tubes are adapted to display zero, except when they are displaying an effective number. Due to this fact, the display is difficult to see distinctly and difficult to interpret due to the display of futile numbers.

In the system described in our copending application Ser. No. 595,875, it is required that a circuit be actuated in order to detect futile zeros and that a counter be activated for detecting the position of a decimal point. In addition, in the system described in our copending application, the display is limited to a number corresponding to only one unit at every one word and a timing pulse is required for this type of display.

SUMMARY OF THE INVENTION

In the system of the present invention, however, a futile zero which is contained in the content of a register is detected by a detecting circuit, such as a counter, in a time interval of approximately two words, and the code for the futile zero is replaced by a redundancy code. Therefore, after the detection of a futile zero, the detecting circuit can be utilized for other purposes until a change of content in the register. In this manner, the entire device is simplified and its control becomes easier as compared with the system described in our copending patent application.

In view of the foregoing, the primary object of the present invention is to provide a number display system in which the code for a futile number stored in a register is replaced with a redundancy code in order to thereby eliminate the display of any futile numbers.

Another object of the present invention is to provide a number display system for use with computers which have a circuit for detecting futile numbers.

A further object of the present invention is to provide a number display system for use with computers in which the display system is provided with a circuit for detecting futile numbers and in which futile numbers stored in the register are replaced with redundancy codes in accordance with the result of a detection process in order to thereby eliminate the display of any futile numbers.

These and further objects, features and advantages of the present invention will appear from a reading of the following detailed description of a preferred embodiment of the present invention, which is to be read in conjunction with the accompanying drawings in which like components in the several views are identified by the same reference numeral.

BRIEF DESCRIPTION OF THE DRAWINGS

FIGS. 3A–3F comprise a series of tables illustrating and explaining the operation of the system of the present invention.

DESCRIPTION OF THE PREFERRED EMBODIMENTS

Figure 1:
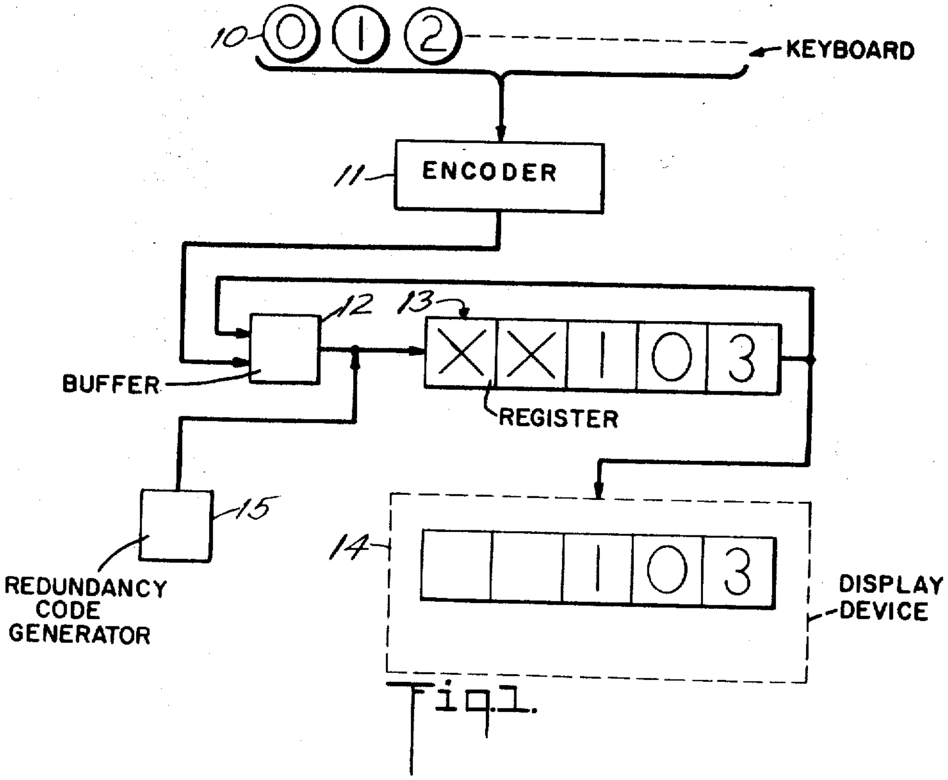
FIG. 1 is a system diagram in block form illustrating one example of a serial number display system for use with computers and as applied to the display of a series of numbers.

The present invention will be described as applied to the display of a series of numbers which have been obtained by sequentially operating or pressing a number of keys such, for example, as of typewriter construction. In FIG. 1 the reference numeral 10 indicates such a keyboard which is so constructed that electrical signals are produced by the sequential selective depression of the keys on the keyboard. The electrical signals so produced are sequentially applied to a encoder 11 which produces code signals corresponding to the depression of the keys on the keyboard 10. The output from the encoder 11 is sequentially fed through a buffer 12 to a register 13. The coded outputs from the register 13 are applied in sequential order to a display device 14 which decodes the coded outputs applied thereto and displays a series of numbers corresponding to the keys which were selectively pressed.

The construction described above is the same as that of the serial display system described and illustrated in our copending application Ser. No. 595,875, and therefore no detailed description of this construtcion will be given. In brief, however, where a number containing three units or digits is applied as an input to a register 13 of the type illustrated in FIG. 1, and which is adapted to display five figures, the register 13 will have a content which contains two zeros ahead of the number of significant figures. The display device 14, as illustrated in FIG. 1, also contains the same number of display units as the register 13 and it, therefore, also displays two zeros in the units not occupied by the three significant numbers. As described in our copending application, however, the display of these two zeros is unnecessary and the purpose of the present invention is to eliminate the display of these futile or insignificant numbers.

In one method contemplated by the present invention, before the outputs from the keyboard 10 are applied to the register 13, a redundancy code is applied to all of the units of the register 13 by a redundancy code generator 15. The coded outputs from the keyboard 10 are thereafter sequentially fed to the register 13. The coded outputs from the register 13 consisting of the redundancy code and the outputs from the keyboard 10 are then sequentially applied to the display device 14 in a predetermined order. Since the display device 14 does not decode the redundancy code it will display only those figures which correspond to the keys of the keyboard 10 which have been selectively depressed. In the practice of this method, accordingly, the display device 14 can be adapted not to display any figures before any of the keys on the keyboard 10 are depressed.

In the other method contemplated by the present invention, the redundancy codes from the redundancy code generator 15 are successively fed to the register 13 for the remainder of a one word period immediately subsequent to the pressing of a key on the keyboard 10. In this manner, the content of the register 13 is replaced with the redundancy codes with the exception of the first input signal code. Thereafter, the outputs from the keyboard 10 are applied to the register 13 in the manner heretofore described. In the use of this method, when a number such, for example, as "103" is to be displayed by selectively pressing the keys "1," "0" and "3" of the keyboard 10 in a sequential order, there is applied from the register 13 to the display device 14 a series output consisting of a redundancy code R, a redundancy code R, a code corresponding to "1," a code corresponding to "0," and a code corresponding to "3." The display device 14 does not decode the redundancy codes and, accordingly, only the number "103" is displayed on the display device 14 as illustrated in FIG. 1, without the display of "0" in the fourth and fifth units. In accordance with this method, the display circuits of the display device 14 each displays "0" before pressing any of the keys on the keyboard 10, thereby indicating that no inputs have been applied to the display device 14. The two above described systems, therefore, differ in what is displayed or not displayed on the display device 14 before any of the keys on the keyboard 10 have been depressed.

Figure 2:
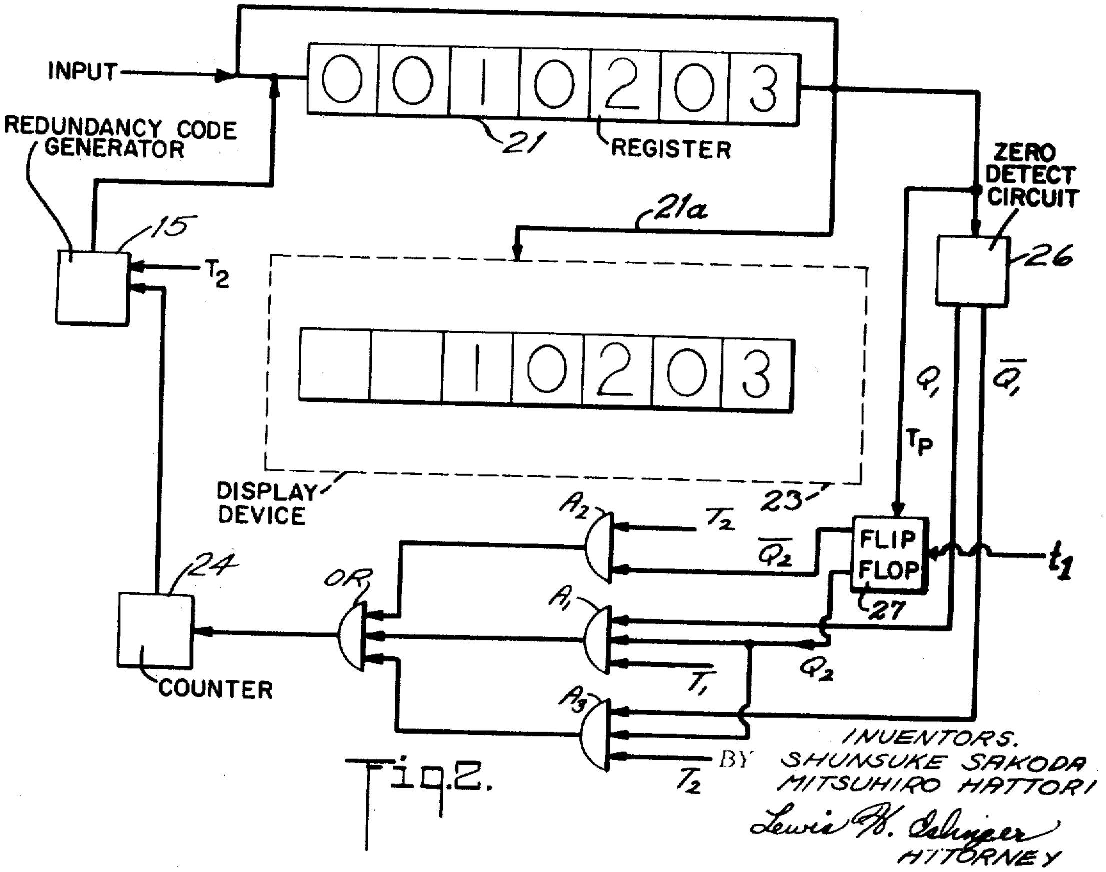
FIG. 2 is a system diagram in block form illustrating another example of the present invention also as applied to the display of a series of numbers based upon the result of a calculation obtained from the register.

Referring now to FIG. 2, the present invention will be described as applied to an application where the content of the register containing the result of the calculation of a computer is applied to a display device. In FIG. 2 the reference numeral 21 identifies a register which is similar to the register 13 except for the number of units. The input to the register 21 may be serially received codes, for example, as developed by the keyboard 10 and encoder 11 as shown on FIG. 1. The content of the register 21 is fed to a display device 23 to be decoded and thereby displayed. As illustrated in FIG. 2, the register 21 is of the type which is capable of displaying seven digits or bits of information. Where the result of a calculation is, for example, "102.03" the register 21 has a content which appears as "00102.03." If the output of the register 21 having such a content is applied to the display device 23, the display device 23 will display the same sequence, i.e., "00102.03." In a case such as this, however, the first two zeros are futile or insignificant numbers and the purpose and object of the present invention is to eliminate the display of such futile or insignificant numbers. In order to eliminate such futile or insignificant zeros, this invention detects such futile or insignificant zeros in, for example, two word periods at the beginning of the application of the content of the register 21 to the display device 23. The codes of the register 21 corresponding to the useless zeros are thereafter replaced with redundancy codes.

In order to accomplish this purpose, the present invention utilizes a detecting circuit such, for example, as the counter 24 for detecting futile or insignificant zeros. During the first word period the counter 24 counts the number of zeros or futile units ahead of a decimal point, and during a second word period it counts the number of all of the units lower than the decimal point including zeroes and the number of all of the units higher than the decimal point, except for units containing a zero. In this manner a time is detected at which the number of changes undergone by the counter 24 is equal to the number of the units or digit positions on the register 21. After this detected time, each of the zero codes issuing from the output of register 21 in each of the remaining digit times of the second word period represents a futile zero and redundancy codes are fed to the register 21 in place of all of these futile zeros. It is to be noted that the counter 24 may reduce to zero from a number which is smaller by one than the number of all of the units or digit positions of the register 21. Thus, where register 21 has seven digit positions, as shown, counter 24 is made to count a like number, that is, to have its content reduced from "0" to "6," "5," "4," "3," "2," "1" and back to "0."

For this purpose, a zero detecting circuit 26 is provided for detecting whether or not the output of the register 21 is a zero. An output representing "0" is referred to as $Q_1$, and an output representing a number except "0" is referred to as $\overline{Q}_1$. The output $Q_1$ is applied to an AND circuit $A_1$ to which have also been applied a signal $T_1$ derived from a conventional timing pulse generator (not shown) and indicating the first word of a two word period, and a signal $Q_2$ representing a period from the arrival of a decimal timing pulse $T_p$ which shows the position of the decimal point during the first word period to the beginning of the second word period. The output of the AND circuit $A_1$ is fed through the OR circuit to the counter 24, thereby permitting the counter 24 to count the "0's" above the decimal point present in the content of the register 21. A signal $T_2$, which indicates the second word period of the two word period, and a signal $\overline{Q}_2$, which indicates the period until arrival of the decimal timing pulse in the one word period, are both applied to the AND circuit $A_2$. The output of the AND circuit $A_2$ is applied through the OR circuit to the counter 24 thereby permitting the counter 24 to count all of the numbers or units, i.e., every bit below the decimal point in the content of the register 21. In addition, the output $\overline{Q}_1$ is applied to the AND circuit $A_3$ which also has applied thereto the signal $T_2$ of the second word period of the two word period. The AND circuit $A_3$ also has applied thereto the output $Q_2$. The output from the AND circuit $A_3$ is fed through the OR circuit to the counter 24, thereby permitting the counter 24 to count the digits except "0" above the decimal point in the content of the register 21. The counter, however, is adapted to initiate counting, that is, to have its content reduced by one, by a count pulse which arrives first after each application of the output of the OR circuit to the counter 24.

Thus, each output from AND circuit $A_1$ occurring during a particular digit time in the first word period of register 21 causes the content of counter 24 to be reduced by one, for example, from "0" to "6" or from "5" to "4," at the beginning of the next digit time. Similarly, each output from AND circuit $A_2$, or from AND circuit $A_3$, occurring during a particular digit time in the second word period causes the content of counter 24 to be reduced by one at the beginning of the next digit time.

In order to avoid the display of futile "0's," a redundancy code generating circuit 15 is provided under the control of counter 24 and the timing pulse $T_2$ derived from the timing pulse generator during the second word period so as to be operative to supply redundancy code R to register 21 during each digit time in the second word period after the digit time when the content of counter 24 becomes "0." When the conventional binary-coded-decimal 8,4,2,1 code is being employed, for example, as disclosed at page 55 of Digital Computer Fundamentals, by Thomas C. Bartee, published 1960 by McGraw-Hill Book Company, New York, N.Y., the redundancy code R may be conveniently the binary code 1111 or 1010 which does not correspond to the code for any of the decimal digits, and thus is incapable of operating the display device 23.

Figure 3A:
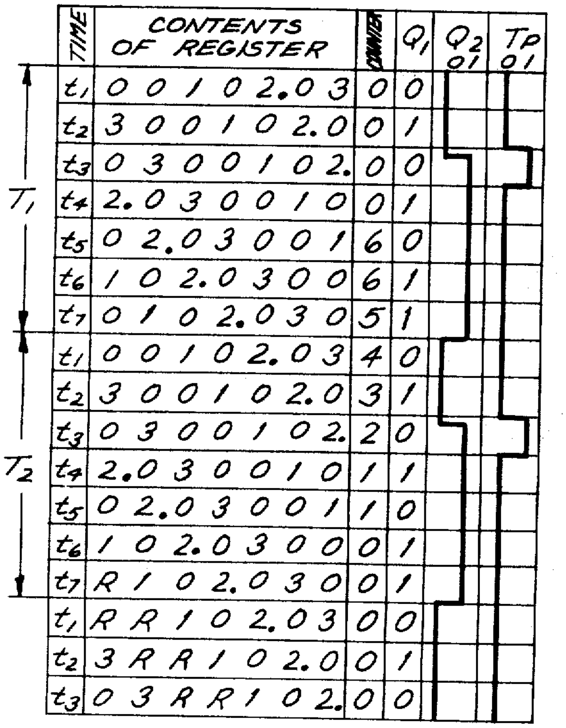

The relationships of the content of the counter 24, outputs $Q_1$ and $Q_2$ and timing pulse $T_p$ to the content of the register 21 are as shown in FIG. 3A for the case where the register content is initially "00102.03." It will be seen that the content of register 21, at the commencement of the third word period, becomes "RR102.03," so that when such content is sequentially supplied to display device 23, which does not decode the redundancy code R, the display is merely "102.03," that is, with the futile "0's" eliminated.

The steps by which the foregoing substitutions are effected in the content of register 21 will be specifically described with reference to FIG. 3A. It will be seen that the contents of register 21 appear in the output of the latter in ascending order of significance, that is, in the order "3," "0," "2," "0," "1," "0," and "0" during each of the first two word periods. Thus, the signal $Q_1$ indicating a "0" code in the register output occurs in the digit times $t_2$, $t_4$, $t_6$ and $t_7$. Since the decimal point, in the example given, is located between the second and third digit positions, the decimal point timing pulse $T_p$ may be made to occur in digit time $t_3$, and, in response to the pulse $T_p$, the signal $Q_2$ may be made to commence in digit time $t_3$ and to continue through digit time $t_7$. The signal $Q_2$, and the signal $\overline{Q}_2$ which occurs during each word period prior to the occurrence of the decimal point timing pulse $T_p$, may be derived from a conventional circuit, for example, a flip-flop 27 which is set by the signal $T_p$ in the output from register 21 and reset by the timing or clock pulse $t_1$ derived from the timing pulse generator at the commencement of each word period.

With the foregoing timing of signals $Q_1$ and $Q_2$, there is an output $(Q_1 \cdot Q_2 \cdot T_1)$ from AND circuit $A_1$ during the first word period in each of the digit times $t_4$, $t_6$ and $t_7$, that is, three outputs from $A_1$ to indicate that there are three "0's" at digit positions higher than the location of the decimal point. Thus, at the commencement of the second word period, the content of counter 24 has been reduced to "4." During the second word period, at which time signal $T_2$ exists, there is an output $(\overline{Q}_2 \cdot T_2)$ from AND circuit $A_2$ in digit times $t_1$ and $t_2$ to indicate that there are two digits at positions lower than the decimal point and to cause the content of counter 24 to be reduced to "2" in digit time $t_3$, and then there is an output $(\overline{Q}_1 \cdot Q_2)$ from AND circuit $A_3$ in digit times $t_3$ and $t_5$ to indicate that there are two digits other than "0" at positions higher than the decimal point and to cause the content of counter 24 to be reduced to "0" at digit time $t_6$ of the second word period.

In response to the reduction of the content of counter 24 to "0" at digit time $t_6$, a control signal is provided by counter 24 to redundancy code generating circuit 15 which also receives the usual clock or synchronizing pulse during each digit time remaining in the second word period, whereby generating circuit 15 is operated to supply redundancy code R to register 21 in substitution for the "0" code issuing from the register output in each of the remaining digit times, that is the digit times $t_6$ and $t_7$, of the second word period. Thus, at the end of the second word period, that is, in digit time $t_1$ of the third word period, the content of register 21 has been converted to "*RR*102.03," from which it is apparent that all "0" codes at digit positions higher than that of the most significant digit are replaced by redundancy code R.

Figure 3B:
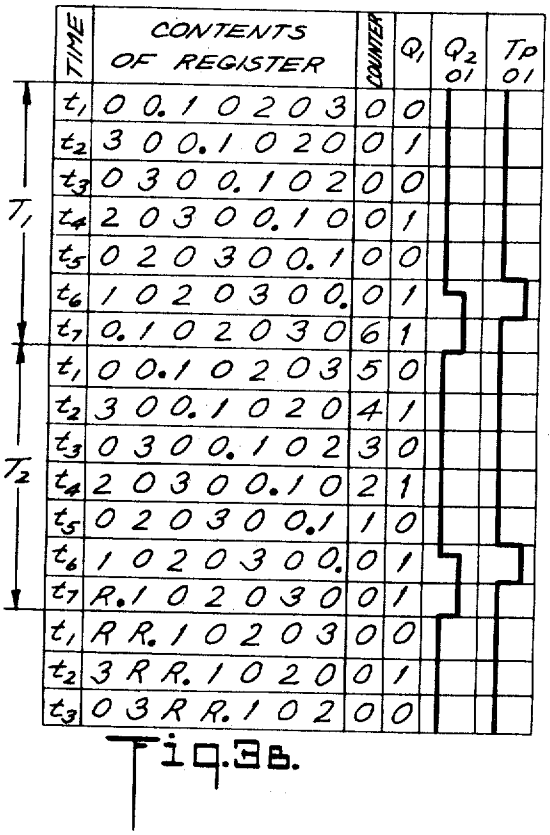
Figure 3C:
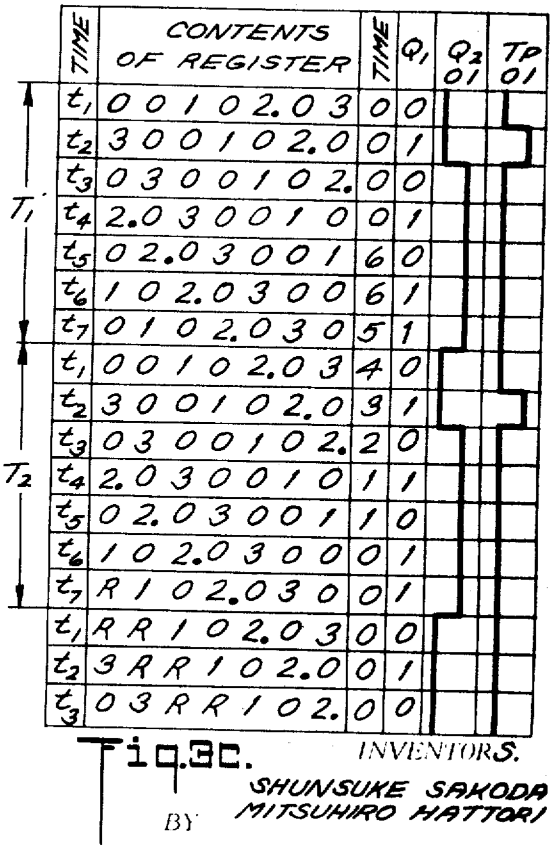

In the table of FIG. 3B there is illustrated the sequence of operation for displaying in a similar manner a number such as "00.10203." In this case, the display device 23 will display the number as ".10203." In the tables of FIGS. 3C and 3D there are illustrated other examples in which the timing pulse $T_p$ is made to arrive or occur one digit time earlier than in the examples of FIGS. 3A and 3B, respectively, whereby to ensure that the signal $Q_2$, in each case, can be reliably made to commence at the digit time when the decimal point arrives at the output of register 21, for example, at the digit time $t_3$ of FIG. 3C and at the digit time $t_6$ on FIG. 3D. This is distinguished from the arrangements of FIGS. 3A and 3B in which the timing pulse $T_p$ occurs at the same digit time $t_3$ or $t_6$ when the signal $Q_2$ is to commence.

In the foregoing example of FIGS. 3B and 3D, the numeral "00.10203" is displayed as ".10203." In the tables of FIGS. 3E and 3F, however, there is illustrated a timing relation whereby the number "00.10203" can be displayed as "0.10203," with the zero immediately preceding the decimal point being displayed even though it is a futile or insignificant zero. As is apparent from these tables, if the signal $Q_2$ is made to commence at a digit time following the application of the timing pulse $T_p$ with the latter occurring when the decimal point reaches the output of the register, the zero ahead of the decimal point is not counted during the first word period $T_1$. Therefore, the counter 24 becomes zero at a time $t_7$ during the second word period as illustrated in the table of FIG. 3F, and the zero immediately before the decimal point is not replaced with the redundancy code. As a result of this, the numeral "00.10203" can be displayed as "0.10203." Of course, if the digit position above the decimal point is occupied by a significant number, that is, by other than a futile zero, as in "00102.03" on FIG. 3E, then the timing relation described above with reference to FIGS. 3E and 3F will nevertheless function to replace all of the codes representing futile zeroes in the content of register 21 with redundancy codes R so as to avoid the display of such futile zeroes.

It will be understood that although preferred embodiments of the invention have been illustrated and described, that many modifications and variations may be effected thereto without departing from the scope of the novel concepts of this invention as set forth in the appended claims.

We claim:

1. A number and symbol display system comprising a register having a plurality of digit portions a first group of which contain codes representing respective digits including any "0's" of an effective number to be displayed and a second group of which, constituted by the remainder of said digit portions, contain codes representing "0," and further having an output in which the code contents of said digit portions appear serially in sequence during cyclically repeated word periods, detecting means for the detection, in said output of the register, of said "0" representing codes, redundancy code generating means operable to supply redundancy code to said register in substitution for any "0" representing code content of the digit portions of said second group, whereby to represent any "0" digits of said effective number to be displayed by codes which are distinctive in respect to said redundancy codes representing futile "0's," a display device having a plurality of digit portions each capable of displaying selectively any digit from "0" to "9," inclusive, and being inoperative to decode said redundancy codes representing the futile "0" code content in said output of the register, and means for serially supplying said output of the register to said display device during said cyclically repeated word periods, and in which the content of said register has a decimal point at a predetermined location therein to provide a decimal timing signal in said output commencing at a related digit time in each word period of the register output, said register output has the content of the register appearing sequentially therein in ascending order of significance, said detecting means has outputs at which first and second detection signals are produced in response to detection of said "0" codes and the others of said codes, respectively, said redundancy code generating means are controlled through counting means having a counting cycle of a number of steps equal to the number of said digit portions in the register, means operative during the first word period of the register output to step said counting means in response to each said first detection signal following the commencement of said timing signal, means operative during the second word period of the register output to step said counting means for each digit time occurring before said commencement of the timing signal, and means operative during said second word period to step said counting means in response to each said second detection signal occurring after said commencement of the timing signal, said redundancy code generating means being made operative to supply redundancy code to said register during each digit time in said second word period following said completion of the counting cycle, whereby, following the supplying of said redundancy code to said register, said display device will display only said effective number.

2. A number and symbol display system according to claim 10, in which said digit time at which the decimal timing signal commences is selected so that, when said location of the decimal point is between the digit position of said most significant digit of the number to be displayed and the next higher digit position, the content of the digit portion of said register at said next higher digit position is other than said code representing "0" at the completion of said second word period.

3. A number and symbol display system according to claim 10, in which said digit time at which the decimal timing signal commences is selected so that, when said location of the decimal point is between the digit position of said most significant digit of the number to be displayed and the next higher digit position, the content of the digit portion of said register at said next higher digit position is said code representing "0" at the completion of said second word period.

References Cited

UNITED STATES PATENTS

| | | | |
|---|---|---|---|
| 3,271,745 | 9/1966 | Schauer | 340—172.5 |
| 3,286,237 | 11/1966 | Kikuchi | 340—172.5 |
| 3,336,587 | 8/1967 | Brown | 340—324.1 |
| 3,375,498 | 3/1968 | Scuitto et al. | 340—172.5 |
| 3,388,384 | 6/1968 | Bogert et al. | 340—172.5 |
| 3,388,385 | 6/1968 | Lukes | 340—172.5 |

CARETH D. SHAW, Primary Examiner

P. R. WOODS, Assistant Examiner

U.S. Cl. X.R.

340—324, 366